US009683415B2

(12) United States Patent
Russell (10) Patent No.: US 9,683,415 B2
(45) Date of Patent: Jun. 20, 2017

(54) HARD-FACED SURFACE AND A WEAR PIECE ELEMENT (71) Applicant: Cutting & Wear Resistant Developments Limited, Sheffield, South Yorkshire (GB)

(72) Inventor: Mark Russell, Sheffield (GB)

(73) Assignee: CUTTING & WEAR RESISTANT DEVELOPMENTS LIMITED, Sheffield, South Yorkshire (GB)

( * ) Notice: Subject to any disclaimer, the term of this patent is extended or adjusted under 35 U.S.C. 154(b) by 0 days.

(21) Appl. No.: 14/305,598

(22) Filed: Jun. 16, 2014

(65) Prior Publication Data
US 2015/0079349 A1    Mar. 19, 2015

Related U.S. Application Data (63) Continuation-in-part of application No. 13/141,457, filed as application No. PCT/GB2009/051756 on Dec. 22, 2009, now Pat. No. 8,752,753.

(30) Foreign Application Priority Data

Dec. 22, 2008  (GB) .................................. 0823339.7

(51) Int. Cl.
*E21B 17/10*    (2006.01)
*B05D 3/02*    (2006.01)
(Continued)

(52) U.S. Cl.
CPC ........ *E21B 17/1085* (2013.01); *B23K 1/0008* (2013.01); *B23K 31/025* (2013.01);
(Continued)

(58) Field of Classification Search
CPC .... E21B 10/46; E21B 10/56; E21B 2010/561; E21B 10/567; E21B 10/573; E21B 17/10; E21B 17/1085
See application file for complete search history.

(56) References Cited

U.S. PATENT DOCUMENTS 3,830,321 A    8/1974    McKenry et al.
4,605,157 A    8/1986    Barr et al.
(Continued)

FOREIGN PATENT DOCUMENTS

EP    1036913 A1    9/2000
EP    1212511 B1    10/2003
(Continued)

OTHER PUBLICATIONS

European Patent Office, International Search Report for PCT/GB2009/051756, Jul. 1, 2010.
(Continued)

*Primary Examiner* — Daniel P Stephenson
(74) *Attorney, Agent, or Firm* — Martinez Law Group PLLC; Melissa M. Martinez (57) ABSTRACT A hard faced surface comprises a metal substrate. Inserts are attached to the substrate as a covering layer on the substrate. Each insert comprises a thermally stable polycrystalline diamond (TSP) body (or polycrystalline diamond or cubic boron nitride) having a plan section, a contact surface and a flat top surface. A boundary coating on the ultra-hard body renders the body wettable by first braze material. A tungsten carbide cap is brazed with said first braze material to at least the top surface of the TSP block. The inserts are brazed to the substrate in a closely packed side-by-side formation with a second braze material that penetrates the gaps between the inserts and between the contact surface of the bodies and the metal substrate. The tungsten carbide caps of the inserts provide a gauge for the hard faced surface, which caps are
(Continued)

ground in a finishing step exposing the caps and providing the hard faced surface with a desired dimension including an amount of the thickness of the caps.

23 Claims, 5 Drawing Sheets (51) Int. Cl.
| | |
|---|---|
| *B23K 31/02* | (2006.01) |
| *B23K 1/00* | (2006.01) |
| B23K 101/20 | (2006.01) |
| B23K 103/06 | (2006.01) |

(52) U.S. Cl.
CPC ...... *B23K 2201/20* (2013.01); *B23K 2203/06* (2013.01); *Y10T 428/2457* (2015.01); *Y10T 428/24612* (2015.01); *Y10T 428/24752* (2015.01); *Y10T 428/24777* (2015.01); *Y10T 428/24975* (2015.01); *Y10T 428/26* (2015.01); *Y10T 428/265* (2015.01); *Y10T 428/30* (2015.01)

(56) References Cited

U.S. PATENT DOCUMENTS

| | | | |
|---|---|---|---|
| 4,902,073 A | 2/1990 | Tomlinson et al. | |
| 5,114,750 A * | 5/1992 | Howard | C04B 41/009 427/123 |
| 5,431,239 A | 7/1995 | Tibbitts et al. | |
| 5,484,191 A | 1/1996 | Sollami | |
| 5,524,719 A * | 6/1996 | Dennis | E21B 10/567 175/432 |
| 5,551,760 A | 9/1996 | Sollami | |
| 5,906,245 A | 5/1999 | Tibbitts et al. | |
| 6,575,350 B2 * | 6/2003 | Evans | E21B 10/46 228/122.1 |
| 7,429,152 B2 | 9/2008 | Oles et al. | |
| 8,146,687 B1 | 4/2012 | Vail | |
| 8,162,082 B1 | 4/2012 | Gonzalez et al. | |
| 2005/0247486 A1 | 11/2005 | Zhang et al. | |
| 2005/0269139 A1 | 12/2005 | Shen et al. | |
| 2006/0032677 A1 | 2/2006 | Azar et al. | |
| 2009/0158898 A1 | 6/2009 | Sherwood, Jr. et al. | |
| 2010/0101868 A1 | 4/2010 | Izaguirre et al. | |
| 2010/0187020 A1 | 7/2010 | Zhang et al. | |
| 2010/0264198 A1 | 10/2010 | Voronin et al. | |
| 2010/0276200 A1 | 11/2010 | Schwefe et al. | |
| 2010/0319996 A1 | 12/2010 | Reese | |
| 2010/0326741 A1 | 12/2010 | Patel | |
| 2012/0121846 A1 | 5/2012 | Russell | |
| 2012/0261977 A1 | 10/2012 | Hall et al. | |
| 2013/0220707 A1 | 8/2013 | Shen et al. | |
| 2013/0277121 A1 | 10/2013 | Stevens et al. | |
| 2013/0313027 A1 | 11/2013 | Sani | |

FOREIGN PATENT DOCUMENTS

| | | |
|---|---|---|
| GB | 2431948 | 5/2007 |
| WO | 95/27588 A1 | 10/1995 |
| WO | 98/13572 A1 | 4/1998 |
| WO | 99/05391 A1 | 2/1999 |
| WO | 02/16725 A1 | 2/2002 |

OTHER PUBLICATIONS

European Patent Office, Written Opinion of the International Searching Authority, Jun. 22, 2011.
European Patent Office, Communication pursuant to Article 94(3) EPC for EP Application No. 13 162 815.8-1362, Apr. 9, 2015.

\* cited by examiner

HARD-FACED SURFACE AND A WEAR PIECE ELEMENT

REFERENCE TO EARLIER APPLICATIONS

This application is a Continuation-in-Part of U.S. patent application Ser. No. 13/141,457 filed Jun. 22, 2011, which is a national phase entry application in the United States of international application number PCT/GB2009/051756 filed Dec. 22, 2009 and published under the number WO 2010/073035, which application claimed priority from United Kingdom patent application number 0823339.7 filed Dec. 22, 2008, and all of which applications are incorporated herein by reference as if fully reproduced below.

STATEMENT REGARDING FEDERALLY SPONSORED RESEARCH OR DEVELOPMENT

Not applicable.

FIELD

This invention relates to a hard faced surface and a wear piece element, and a method of construction thereof. The invention has application in downhole drilling equipment, particularly to hard face the surface of stabilisers. Wear faces also exist on fishing tools and on drilling bits and other components. They are simply the surfaces of tools designed to bear against a substrate and to wear. Accordingly, it is generally desirable that wear faces are resistant to wear and therefore are correspondingly hard.

BACKGROUND

Stabilisers are well known for centralising a drill string in a hole and when the stabiliser is adjustable to permit a change in direction of a drill string. Stabilisers involve surfaces, often cylindrical in part, either straight or spiralled, that bear against the surface of the hole being drilled. Such surface is of course hard and uneven and causes substantial wear of the part bearing against it. It is known to face the bearing surfaces with a plurality of tiles of tungsten carbide. See, for example, WO-A-99/05391. It is also known to use hard material, such as diamond and WO-A-99/05391 suggests inserts in the facing edges of stabilisers comprising tungsten carbide, polycrystalline diamond and cubic boron nitride.

The problem with polycrystalline diamond, or any hard facing elements, is attaching them to surfaces of tools. The tools themselves are generally made of a steel that has the correct strength and toughness for the applications the tool is intended for. However, even if it was cost-effective to do so, a tool would never be made entirely out of material that was hard enough to withstand the rigours of bearing against the bore surface during drilling operations. However, attaching a layer of material that is strong enough is difficult, particularly on surfaces that are moving in a direction parallel to the surface, with objects striking the surface tending to swipe off elements attached to the surface.

Tungsten carbide can be brazed to steel easily and securely enough, particularly when an entire surface is covered. However, WO-A-95/27588 addresses the problem of holding elements still while they are being brazed, because, as soon as braze melts, it reduces friction substantially between element and substrate and, on curved surfaces such as stabilisers, they tend to fall off. The solution proposed by WO-A-95/27588 is to tack-weld the elements first, so that the subsequent brazing step does not dislodge the elements and they can be accurately positioned.

However, tungsten carbide is not the hardest material available and polycrystalline diamond (PCD), and its construct, thermally stable polycrystalline diamond (TSP), are known to be harder and tougher in these applications. So also is cubic boron nitride, which, along with PCD and TSP are herein together referred to as ultra-hard materials, and references to TSP hereinafter should be considered to include references to ultra-hard materials generally unless the context dictates otherwise. Most braze materials do not readily wet TSP and so connecting them reliably is difficult. PCD is not always suitable, in any event. PCD generally includes the catalyst that facilitates the binding of the diamond crystals together. Because these tend to have different thermal properties, high temperature applications are frequently ruled out for PCD because differential expansion of catalyst can break up the PCD. Also, PCD tends to be chemically reactive, particularly in contact with steel, and may reduce diamond to graphite, carbon monoxide and carbon dioxide.

WO-A-99/05391 suggests embedding the TSP in pockets at the edge of a tool, and this works reasonably well when the direction of impacts is into the pockets. Indeed, PCD and TSP are used frequently on drill bits where precisely this direction of impact applies. However, as mentioned above, on stabilisers, the direction of impacts tends to be transverse, and, in any event, there are not the pockets in which to locate the TSP/PCD elements because they are to cover a large part of the surface of the stabiliser.

It is known to coat TSP and PCD with less hard material so that the elements formed in this way are capable of being connected to a substrate, but it is an expensive process to manufacture composite elements comprising a core of TSP or PCD and a coat of less hard material. EP-A-1212511 and EP-A-1036913 both suggest embedding TSP in a larger body of tungsten carbide. This results in a satisfactory product, but holding a TSP element inside a mould in which a tungsten carbide piece is to be sintered is problematic. EP-A-1212511 suggests providing a coating of electrically conductive material on the PCD so that they can be tack welded and then brazed in place.

GB-A-2323112 discloses a method of breaking out of a cased wellbore using a drilling bit that first cuts through the steel casing and second cuts the geological formation. Composite cutting inserts are disclosed that comprise an annular body of tungsten carbide (or $Al_2O_3$, TiC, TiCN, TiN or the like, suitable for milling steel and non-reactive therewith) provided with a chip-breaking edge and a cylindrical body of ultra-hard material such as polycrystalline diamond. However, no method of connection is disclosed between them.

GB-A-2431948 discloses a catalyst-free polycrystalline ultra-hard body (TSP) brazed to two separate back and side support elements (tungsten carbide) for use on a drill bit. Two support elements are employed so that they better support the TSP body and so that they can move relative to each other when the components are brazed together to remove voids and unwanted stress concentrations.

It is an object of the present invention to provide a simple construction of wear surface incorporating ultra-hard materials such as TSP. It is also an object to facilitate gauging of the surface, once formed, so that it has a consistent and desired surface depth with respect to the substrate.

BRIEF SUMMARY OF THE DISCLOSURE

In accordance with the present invention there is provided a hard faced surface comprising:

a) a metal substrate,
b) inserts attached to the substrate as a covering layer on the substrate, wherein each insert comprises:
  i) an ultra-hard body having a plan section, a contact surface and a flat top surface;
  ii) a boundary coating on the ultra-hard body to render the body wettable by first braze material; and
  iii) a tungsten carbide cap brazed with said first braze material to at least the top surface of the ultra-hard body; and wherein
c) the inserts are brazed to the substrate in a side by side formation with a second braze material that penetrates the gaps between the inserts and between the contact surface of the bodies and the metal substrate, the tungsten carbide caps of the inserts providing a gauge for the hard faced surface that is ground in a finishing step, which finishing step serving to expose the caps and provided the hard faced surface with a desired dimension including an amount of the thickness of the caps.

Optionally, pips are disposed on the contact surface of the bodies to facilitate tack-welding of the inserts to a substrate.

Said plan section may be rectangular and said side by side formation is a closely packed tile formation, whereby the ultra-hard body is shielded from direct washing with flame in a flame-spray brazing step employed to braze the inserts to the substrate.

In accordance with an aspect of the present invention there is provided a tungsten carbide/TSP insert for hard facing a wear surface, said insert comprising:
a) an ultra-hard body in a geometric shape having a plan section enabling the bodies to be tiled over a surface without substantial gaps between them, a contact surface and a flat top surface;
b) a boundary coating comprising tungsten on the ultra-hard body to render the bodies wettable by braze material, wherein the tungsten reacts with carbon/nitrogen across the surface boundary of the ultra-hard body to form a tungsten carbide/nitride interface between the boundary coating and the ultra-hard body; and
c) a tungsten carbide cap brazed to at least the top surface of the ultra-hard body with a first braze material.

This arrangement advantageously provides inserts that can be easily brazed to a substrate, for example the wear surface of a drill string stabiliser. Furthermore, the inserts comprise ultra-hard bodies over their entire plan section, so that a high proportion of the area of a substrate can be covered with ultra-hard material.

The ultra-hard body may be polycrystalline diamond (PCD), its construct, thermally stable polycrystalline diamond (TSP), or cubic boron nitride. Preferably, it is TSP, in which case the tungsten of the boundary coating reacts with carbon across the surface boundary of the ultra-hard body to form a tungsten carbide interface between the boundary coating and the ultra-hard body.

In an embodiment the boundary coating comprises tungsten alloyed with 0.0004-0.3 wt % with a halide, for example, fluorine.

In another embodiment the boundary coating comprises a first coating that is between 0.5 and 25 microns thick.

In a further embodiment the boundary coating may further comprise a second coating applied to the ultra-hard body, wherein the second coating comprise tungsten between 5 and 30 microns thick, and wherein the first coating is less than 5 microns thick.

The tungsten carbide cap may be between 0.2 and 1 mm thick.

In an aspect of the invention the tungsten carbide cap may be brazed to the ultra-hard body using a copper-based braze material.

In another aspect of the invention the ultra-hard body may be substantially cuboidal in shape, whereby the plan section of ultra-hard body is substantially rectangular.

In another aspect the plan section of the tungsten carbide cap may be substantially the same as the plan section of the ultra-hard body. In a further aspect the plan section of the tungsten carbide cap may have at least one rounded corner.

According to an embodiment of the invention the insert may further comprise at least one pip on a bottom surface of the ultra-hard body, which pip facilitates tack-welding of the insert onto the substrate. The pip may comprise a separate element, for example a rod, brazed onto the contact surface. The ultra-hard body may be formed with a groove in which to receive and locate the element.

In a different embodiment the invention relates to a perforated mat having a plurality of inserts as described above attached thereto, said mat having at least one perforation associated with each insert, whereby an electrode can be brought into contact with each of said inserts via the perforation associated with that insert.

In a further aspect the inserts may be arranged on the mat in a closely packed tile formation. In a still further aspect the inserts may be arranged in a plurality of rows, each row comprising a plurality of inserts disposed in an end-to-end arrangement, the inserts in each row being offset from the inserts in adjacent rows. In some embodiments the inserts in adjacent rows may be offset by a distance approximately equal to half the length of the inserts. In an embodiment the inserts may be arranged on the mat such that at least 50%, preferably at least 60%, of the surface of the mat is covered by the inserts.

In another embodiment the inserts on the hard faced surface may be arranged in a plurality of rows, each row comprising a plurality of inserts disposed in an end-to-end arrangement. In a further embodiment the inserts in each row may be offset from the inserts in adjacent rows. In a preferred embodiment the inserts may be offset by a distance approximately equal to half the length of the inserts.

In another embodiment, the inserts are tiled on the substrate in a chevron or herring-bone pattern of overlapping inserts.

In another embodiment at least 50%, preferably at least 60%, of the surface area of said metal substrate may be covered by said inserts, the remaining area comprising space between the inserts filled with the second braze material (which at least partially affixes the inserts to the substrate).

In another embodiment the second braze material may be different from the first braze material.

In a further embodiment of the hard faced surface described above, the metal substrate is the outer surface of a drill string stabiliser.

In another embodiment the invention relates to a method for construction of a tungsten carbide/ultra-hard body insert comprising the steps of:
  providing an ultra-hard body in a geometric shape having a plan section enabling the bodies to be tiled over a surface without substantial gaps between them, a contact surface and a flat top surface;
  coating the ultra-hard body with a layer of tungsten alloyed with fluorine, wherein the tungsten reacts with carbon/nitrogen in the ultra-hard body to form an intermediate layer of tungsten carbide/nitride;

brazing a tungsten carbide cap to at least the top surface of the ultra-hard body with a first braze material.

In a further embodiment the invention relates to a method of hard facing a substrate comprising the steps of:
  constructing a tungsten carbide/ultra-hard insert by the method described above;
  tack welding the insert to a substrate to temporarily attach the inserts to the substrate; and
  brazing the inserts to the substrate with a second braze material to permanently attach the inserts to the substrate.

A method of construction of the insert comprises the steps of:
  forming an ultra-hard body;
  coating the body with a thin film of metal so that carbon or nitrogen from the ultra-hard body forms a metal carbide/nitride with the metal at the surface of the body;
  fitting a tungsten carbide cap on the body; and
  fixing the cap by brazing the cap to the metal film.

Optionally, said metal is tungsten. It may have a thickness of between 5 and 50 microns, optionally about 10 (between 7 and 20) microns. As above, the ultra-hard body may be polycrystalline diamond (PCD), its construct, thermally stable polycrystalline diamond (TSP), or cubic boron nitride. Preferably, it is TSP, in which case the tungsten of the boundary coating reacts with carbon across the surface boundary of the ultra-hard body to form a tungsten carbide interface between the boundary coating and the ultra-hard body.

Said tungsten carbide cap may be formed with a slot or pocket in which to receive the body. The cap may be pressed into a solid body without sintering, said slot then being cut in the body, and said body then being sintered. Said cut may be made with a suitable (e.g., diamond) grinding wheel using a single pass to form the slot.

The advantage of this arrangement is that an essentially solid block of the tungsten carbide is formed without the necessity of the tungsten carbide powder to compact evenly into narrow fillets during the pressing stage of its formation. However, before the body is finally sintered, it is relatively easily cut with a suitable grinding wheel using a single pass to form the slot.

The slot or pocket, when provided, is preferably in a bottom face of the insert that is adapted to seat on a substrate and wherein fixing the insert on the substrate is effected by a brazing step. The edges of the slot or pocket on said bottom face may be adapted for welding to the substrate for intermediate fixing of said insert. The welding may be by tack-welding, that is by an electric discharge and resistance heating.

Preferably, two ridges are formed across the tungsten carbide body such that said slot cuts the ridges and leaves four pips, two on each edge of the slot, whereby said welding step is facilitated by concentrating electric discharge through said pips comprising the primary contact with the substrate.

During said brazing step (of the insert to the substrate), braze material may flow between said body and the substrate surface, and between the edges of the slot or pocket, when provided, of the tungsten carbide cap and the substrate surface, and between adjacent inserts. Said brazing is preferably effected by flame-spraying.

However, the step of brazing the ultra-hard body to the cap (and in said slot or pocket, when provided) is preferably a separate and preceding step to the step of brazing said insert to a substrate. Indeed, preferably, the step of brazing said ultra-hard body in said slot is performed in a furnace using a first braze material.

The advantage of this arrangement is several-fold. Firstly, the brazing can be conducted in a controlled environment in the furnace, whereby the conditions under which a successful braze joint between TSP, PCD or c-BN and tungsten carbide can more readily be achieved and controlled. Secondly, the nature of the braze material can be optimised for the bond intended. Thirdly, although somewhat related to the first, pure heat can be employed to effect the braze at precisely the correct temperature without washing the surfaces of the TSP, PCD or c-BN with flame that could overheat and undermine the chemical stability of the ultra-hard body. The cap serves to protect the ultra-hard body, even when it only covers the flat top surface of the ultra-hard body. Indeed, the plan section of the ultra-hard body is preferably such a shape that a closely tiled packing of the inserts is feasible so that only the caps are exposed to the external environment, and the flame spray during said brazing of the inserts to the substrate.

The dimensions of the substrate are corrected after brazing of the inserts to the face of the substrate, said adjustment being effected by grinding the braze lying on the exposed faces of the insert and said exposed face of the cap, but without grinding the ultra-hard body itself. Indeed, the level of the face of the substrate may be set so that, once the inserts have been welded and brazed in position it will be necessary to remove at least a portion of the depth of the cap to achieve a required dimension of the substrate.

In one embodiment of the present invention the substrate is a stabiliser and the wear faces to be hard-faced are the part-cylindrical surfaces of the stabiliser intended to bear against the bore of a wellbore. The stabiliser will have a specified diameter and preferably the grinding of the surface after brazing of the inserts to the wear faces removes some of the inserts to expose them and demonstrate to the user that the stabiliser has been hard-faced.

BRIEF DESCRIPTION OF THE DRAWINGS

Embodiments of the invention are further described hereinafter, by way of example, with reference to the accompanying drawings, in which:
FIGS. 4a and b are a perspective view and side view of a hard-faced substrate in accordance with the present invention;
FIGS. 10A and B are a top, and an underneath, perspective view, respectively, of a further embodiment of insert in accordance with the present invention.

DETAILED DESCRIPTION

Figures 1, 3:
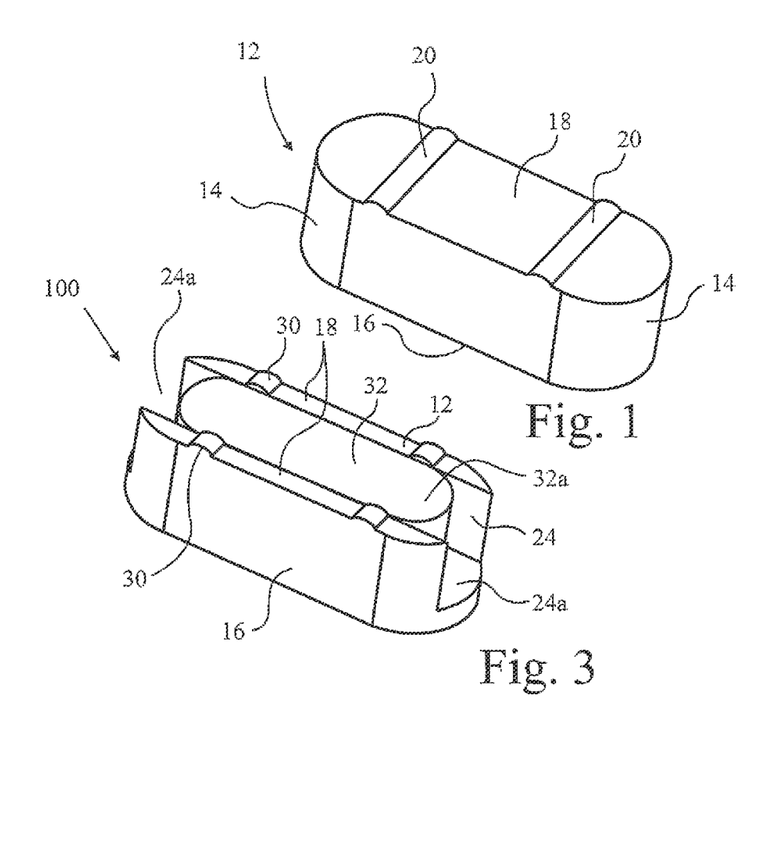
FIG. 1 is a perspective view of a tungsten carbide body.
FIG. 3 is a perspective view of the ultra-hard body received in the tungsten carbide body, to form an insert according to the present invention.

In FIG. 1, a tungsten carbide body 12 is formed by the usual pressing process in which tungsten carbide grains are mixed with a binder in the form of cobalt or nickel and pressed together in a die of the appropriate shape to form a body as shown in FIG. 1. This shape is essentially cuboid, with rounded ends 14 and a flat top 16, and a base 18 which is also flat except for two ridges 20. The temperature at which the body is presintered does not result in complete melting of the binder and, accordingly, the body 12 created is not, at this stage, reaching its full hardness. It is straightforward, therefore, subsequently to run a circular diamond grinding wheel along the length of the body 12 to create a longitudinal slot 24 having a flat bottom 26 and side walls 28. The cutting of the slot 24 divides the ridges 20 into four pips 30.

The tungsten carbide body 12 is given its final sintering to complete the cementation of the tungsten carbide and optimise the body for hardness.

However, it is also possible to sinter the tungsten carbide body in a single step and then wire-cut the slot with an electric discharge machining wire.

Figure 2:
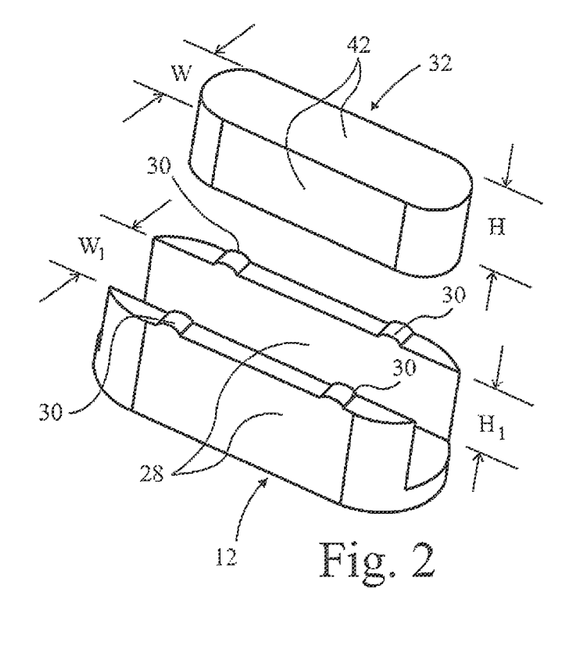
FIG. 2 is a perspective view of a tungsten carbide body having a slot formed in it and a ultra-hard body above it.

A TSP body 32 is formed using known techniques. It has a width W slightly less than the width $W_1$ of the slot 24. Moreover, it has a height H, the same as the depth $H_1$ of the slot 24.

Accordingly, when the TSP body 32 is inserted into the slot 24, a hard facing insert 100 (see FIG. 3) is formed. However, at this stage, there is no retention of the TSP body in the slot 24. For this purpose, the body 32 is coated with a first braze material. A suitable braze material is nickel or copper-based alloys, such as nickel chrome boron. The assembled insert 100 is then heated in a furnace to 1100 deg. C. The braze melts and bonds the TSP, usually by way of an intermediate coating on the TSP (such as titanium, tungsten, nickel and copper, amongst others), to the tungsten carbide body 12.

When the insert 100 has been assembled, it can then be applied to a substrate, such as a stabiliser wear surface, by the techniques described in WO-A-95/27588. The pips 30 form contact points with the substrate and, when an electric welding electrode is applied to the top 16 of the insert 100 an initial weld, caused by resistance heating at the point of contact between the insert 100 and substrate, can be effected. Moreover, the pips 30 are arranged so that the remaining gap between the edges 18 of the slotted body 12 and the substrate are such that melted braze in a subsequent brazing step can penetrate between the edges 18 and the substrate by capillary action. Furthermore, given that the height H of the body 32 is the same as the depth $H_1$ of the slot 24, then the bottom face 32a of the TSP element is flush with the edges 18.

Accordingly, when flame-spraying of a second braze is effected, in a subsequent step, the flame-sprayed braze is melted and penetrates all the voids between the surfaces 18,32a and the substrate and between the inserts 100 and their neighbours.

The second braze preferably has a melting temperature less than the first braze material, and the flame spraying is controlled so that the temperature of the substrate and inserts does not rise above the melting temperature of the first braze. This ensures that there is no possibility of compromising the connection between the TSP and the tungsten carbide bodies.

However, even if the same braze material is employed, or the second has a higher melting point than the first, nevertheless, this is unlikely to damage the connection between the TSP and the tungsten carbide, and the TSP is in any event fully encased in the slot 24 and so protected from adverse effects of the flame spray.

This penetration includes into pockets 24a defined at either end of the slot 24 by virtue of the length of the TSP body 32 not extending to the full length of the tungsten carbide body 12. The pockets 24a are not essential, however. They exist purely because TSP bodies 32 of the shape shown in FIG. 2 are currently easily available, as are tungsten carbide bodies 12 of the shape shown in FIG. 1. If construction of the moulds for the two bodies 12,32 were to be designed from first principles, the TSP body 32 might have the same shape, but it is likely that the body 12 would be rectangular of a similar length to the body 32. This would still leave two corner pockets (not shown) at each end of the composite insert 100, but that would better enable the tungsten carbide bodies 100 to shield the bodies 32 from the effect of the flame brazing process.

Once the attachment of the inserts 100 is complete, the hard faced substrate is ground to the design surface dimensions, preferably with enough braze material being removed to expose the tops 16 of each insert 100, so that they can be seen, indicating to the user that the surface in question had been hard faced. Indeed, the oval shape of the insert 14 can be employed to demonstrate that the hard facing is a TSP composite.

Figures 4A, 4B:
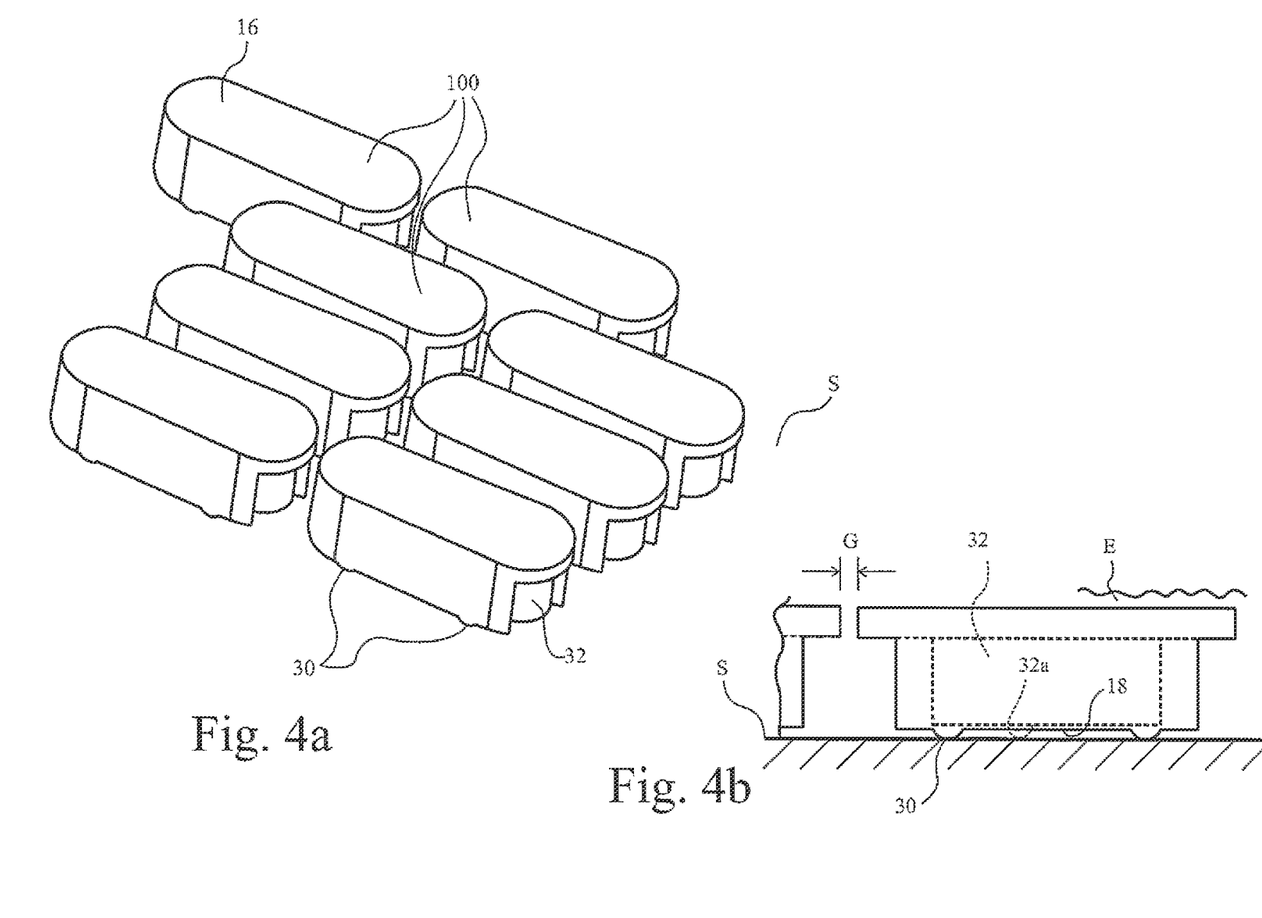

Turning to FIGS. 4a and b, a substrate S (for example, the part-cylindrical surfaces of a stabiliser) has a plurality of inserts 100 connected thereto. These can be conveniently provided as a mat, with top surfaces 16 adhered to perforated paper, one perforation per insert. When the inserts are positioned on the substrate S the electrode of a tacking welding gun is applied to the top surface 16 (through the perforation in the paper backing, not shown) and energised. The current flows through the pips 30 causing them to melt and the inserts temporarily to be attached to the substrate. Subsequently, during the flame-spraying process, the paper is burnt off and braze penetrates the regular gap G provided between the inserts filling the voids including end spaces 24a and the gaps between the bottom edges 18, and the bottom surface 32a of the TSP body 32, and the substrate S. Finally, excess braze E is removed in the final sizing grinding operation.

Indeed, providing 1 or 2 millimetres of tungsten carbide on the top T of the assembly allows the tool to be ground easily to its finished size; the TSP 32 will then be exposed after an initial wear phase has taken place, thereafter providing the enhanced wear resistance diamond can offer.

Figure 5:
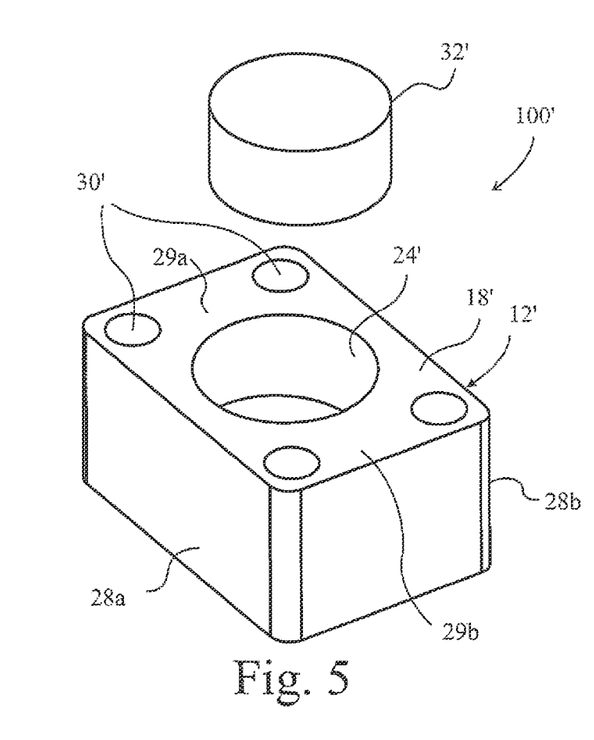
FIG. 5 is a further embodiment of an insert according to the present invention.

Turning to FIG. 5, an alternative embodiment is illustrated of an insert 100' in accordance with the present invention. Here, instead of a slot, a pocket 24' is formed in a tungsten carbide body 12'. A cylindrical TSP body 32' is a close sliding fit in the pocket 24', and can be brazed in there as per the embodiment described above with reference to FIGS. 1 to 3. Here, the insert 100' is not intended for a stabiliser as a facing tile, but is a wear element in the form of a tooth for use on a fishing tool, or more especially, a break out tool. In any event, the insert enables the tool to be provided with a rake angle by virtue unequal heights of walls 28a,b of the body 12'.

The edge 18' of the body 12' is provided with four pips 30' for tack-welding the insert 100' in place, prior to brazing by flame-spraying. As previously described, the step of brazing the TSP body 32' into the pocket 24' is preferably carried out previously in a controlled environment of a furnace. The TSP body may be pre-coated to aid wetting thereof by the braze material. The coating may be of titanium, tungsten, nickel and copper, amongst others. The walls 28a,b, as well as the ends 29a,b of the tungsten carbide body 12' entirely surround the TSP body 32'. Even more so than the previous embodiment, therefore, when the insert 100' is placed against the substrate on which it is to be mounted (with the pips 30' abutting the substrate), these walls 28/29,a/b, as well as the substrate (not shown) shield the TSP almost entirely from the adverse effects of the brazing torch flame. Accordingly, the TSP is in good condition when exposed by wear of the tungsten carbide around it, to provide its enhanced wear resistance.

Figure 6:
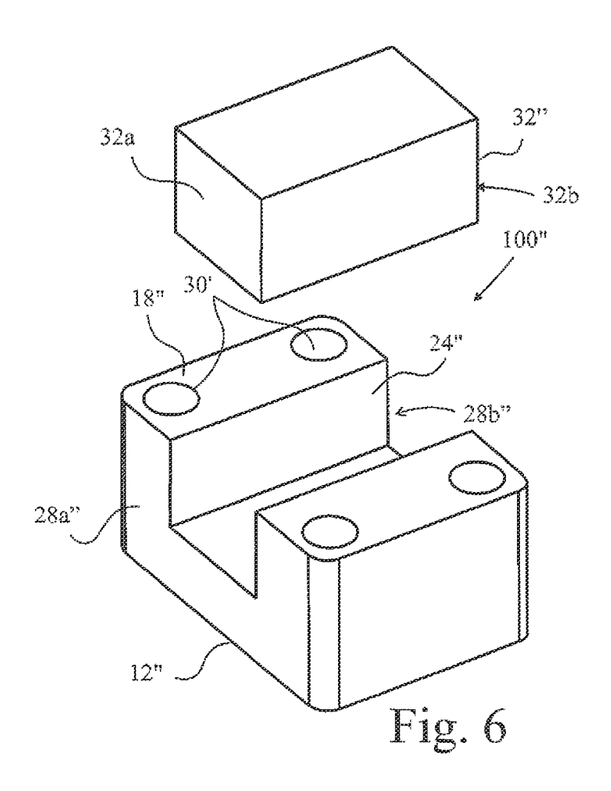
FIG. 6 is a further embodiment, being a variation of the FIGS. 2/3 and 5 arrangements.

FIG. 6 illustrates of an insert 100" in accordance with the present invention that is a combination and variation of the embodiments described above. Here, the body 12" is most like the body 12' in FIG. 5, but instead of a pocket 24', a slot 24" is formed in a tungsten carbide body 12". A cuboid TSP body 32" is a close sliding fit in the slot 24" so that its ends 32a,b are contiguous with end faces 28"a,b of the tungsten carbide and the body 32" completely fills the slot 24". The insert can be brazed in, as per the embodiments described above. Here, the inert 100" is suitable both for a stabiliser as a facing tile and as a wear element in the form of a tooth for use on a fishing tool or a break out tool.

As with FIG. 5, the edge 18" of the body 12" is provided with four pips 30' for tack-welding the insert 100" in place, prior to brazing by flame-spraying. Although the tungsten carbide body 12" does not entirely surround the TSP body 32', when the insert 100" is tiled onto a substrate on which it is to be mounted (with the pips 30' abutting the substrate), the exposed faces of the inserts effectively shield the TSP almost entirely from the adverse effects of the brazing torch flame. Accordingly, the TSP is in good condition when exposed by wear of the tungsten carbide around it, to provide its enhanced wear resistance.

As mentioned above, the hard body 32,32',32" can simply be glued in place in the slots 24,24" or pocket 24', using an epoxy resin, a cyanoacrylate glue or other suitable glue. Alternatively, the edges 18,18',18" of the tungsten carbide body may be crimped to provide an interference holding of the body in the slot or pocket to hold the body during subsequent transportation and handling prior to the insert 12 being fixed as described above to the substrate.

Figure 7:
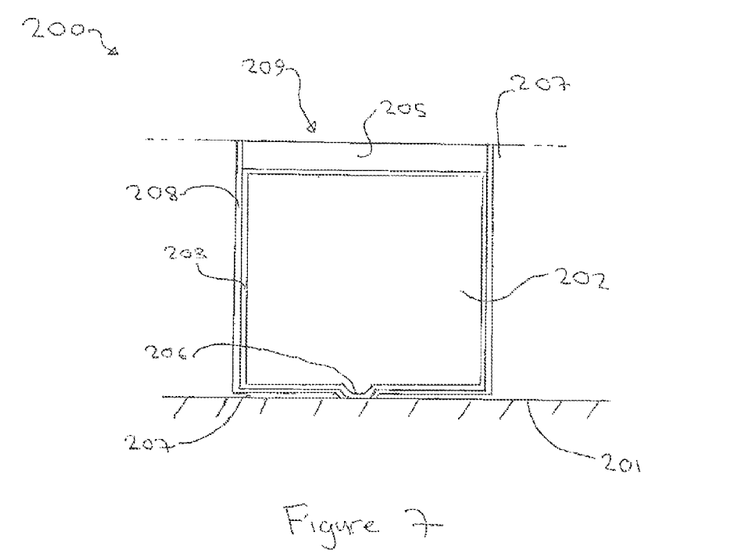
FIG. 7 is a further embodiment of a hard-faced substrate using a different construction of inserts.

FIG. 7 shows a hard faced substrate 200 in a further embodiment of the present invention. A plurality of inserts 209 (only one being shown in the drawing) are attached to tool surface 201. Inserts 209 comprise a TSP body 202 provided with a coating 203, which coating comprises tungsten, and a tungsten carbide cap 205, brazed to the coated TSP body 202 with braze material 208. A tungsten carbide cap 205 is brazed to the TSP body with a first braze material 208. Once assembled the inserts 209 are brazed to substrate 201 with second braze material 207.

Coating 203 is provided to increase the wettability of TSP body 202, so that the first and second braze materials securely attach the cap to the TSP body and the insert to the substrate. Preferably, coating 203 comprises tungsten alloyed with 0.0004-0.3 wt %, more preferably 0.001-0.12 wt %, fluorine. In any event, the coating 203 is applied in a way that allows the tungsten to react with the carbon in the TSP to form a tungsten carbide interface between the TSP and the tungsten, so that a strong chemical bond exists between the coating and the TSP body. Such a coating can be applied using chemical vapour deposition, and may comprise a first tungsten coating, which coating is configured to react across the boundary with the TSP to form an interface layer of tungsten carbide, and a second tungsten coating applied on top of said first coating. Briefly, the first tungsten coating may be applied by placing the uncoated TSP inserts in a chemical vapour deposition reactor containing a gas that includes tungsten, preferably a compound thereof such as tungsten hexafluoride ($WF_6$), at high temperature, for example 400-800 degrees C., and holding the inserts there for sufficient time for a layer of tungsten of the desired thickness to form, for example between 30 minutes and 1 hour. Once the coating is applied the inserts may be annealed at vacuum pressure (e.g. 0.1 Pa or less) and a temperature higher than the temperature at which the coating was applied to induce the tungsten in the coating to react with the carbon in the TSP to form a tungsten carbide layer. Optionally, after the annealing step a second tungsten coating may be applied on top of the first coating by chemical vapour deposition, as described above.

Providing the tungsten used for the first and second coatings in the form of tungsten hexafluoride may advantageously cause the final composition's first and second coatings to comprise tungsten alloyed with 0.0004-0.3 wt % fluorine. A more detailed description of processes for applying tungsten coatings to diamond containing articles so that the tungsten in the coating reacts with the carbon in the diamond to form a tungsten carbide interface layer can be found in EP1300380. A coating can also be achieved using the process described in GB patent application number 1305637.9 of Hardide plc, the contents of which are hereby incorporated by reference and an extract thereof is included in the Appendix hereto.

A first coating may be between 0.1 and 500 microns thick. If a second coating is to be provided then the first coating is preferably less than 5 microns thick, and the second coating may be between 5 and 30 microns thick. The thickness of the first and second coatings is preferably chosen so that the overall thickness of the boundary coating 203 is between 15 and 20 microns.

Once coating 203 is applied, cap 205 is brazed to the coated TSP body using a first braze material. The first braze material coats TSP body 202 and cap 205 and fills the small gaps between TSP body 202 and cap 205, thus firmly attaching cap 205 to TSP body 202, to form inserts 209. Brazing of cap 205 to TSP body 202 is preferably performed in a furnace, where the temperature, pressure and the composition of the atmosphere can be tightly controlled. It is especially important to control the temperature during the first brazing process, because TSP may be damaged by high temperatures. Cap 205 may be temporarily attached to TSP body 202 before brazing takes place. However, this is not essential as, provided the cap is held in contact with the TSP body during the brazing process the cap will be firmly attached to the TSP body, and if the cap is placed on top of the TSP body (or vice versa) then the weight of the cap (or the TSP body) provides a sufficiently strong contact for the cap to be securely brazed to the TSP body. Accordingly, before brazing, the cap and TSP body may be placed in a support within the furnace that maintains the position of the cap relative to the TSP body so that they remain in a desired position relative to each other, but the support may not apply additional pressure between the cap and the TSP body.

In the illustrated embodiment the first braze material is a copper-based alloy. The first braze is preferably applied in a furnace at approximately 1100 degrees C. Because of the tungsten coating 203, braze material wets TSP body 202 and fills the small gaps between TSP body 202 and cap 205. Because of its high melting temperature, the tungsten coating 203 does not melt during the brazing process. The skilled person will understand that alternative choices of first braze material, such as nickel or silver based alloys, would also be suitable.

Inserts 209, comprising coated TSP body 202 and cap 205, are attached to substrate 201 using a second braze material, which is applied in a second brazing step. Because substrate 201 is unlikely to be flat it may be necessary to temporarily attach inserts 209 to substrate 201 before the second brazing step. In the embodiment illustrated in FIG. 7 inserts 209 are provided with one or more pips 206 on the contact surface of TSP body 202. Pips 206 allow inserts 209 to be temporarily attached to substrate 201 by tack welding, in which insert 209 is placed onto with substrate 201 so that pips 206 are in contact with substrate 201 and a short duration electric current is then passed from the upper surface of insert 209 to the substrate 201. Because the contact area between pips 206 and substrate 201 is small, the current density at the contact area is very high, and this causes the contact area to heat up significantly, melting part of substrate 201 or insert 209 (and its coating 203) and causing material to diffuse over the boundary between the substrate 201 and the insert 209 so that the substrate is attached to the insert once the contact area solidifies. It should be noted that TSP body 202 is itself a poor conductor of electricity. It is therefore important that tungsten coating 203 and first braze material 208 are sufficiently thick to conduct the current used in the tack-welding procedure to pips 206 without heating up excessively. A third, electrically conductive, coating (not shown) may be applied to the inserts 209 if tungsten coating 203 and first braze material 208 do not provide sufficient electrical conductance. The third coating preferably comprises tungsten, nickel or copper.

The process of temporarily attaching inserts 209 to substrate 201 may be time consuming, as a large number of inserts are likely to be required to cover substrate 201. Accordingly inserts 209 may be provided on a sheet (not shown), having holes to allow an electrode to be applied to the surface of the insert that is opposite pips 206. Advantageously, such a sheet may be provided with a plurality of inserts arranged in a predetermined pattern, so that once the position and orientation of one of the inserts on the sheet is fixed relative to the substrate the position of all of the rest of the inserts on the sheet is also fixed. Providing inserts on a sheet may therefore speed up the process of tack-welding the inserts to the substrate. If the inserts are provided on a sheet they are preferably arranged in a tightly-packed formation, so that at least 50%, preferably at least 60%, of the surface area of substrate 201 is covered by inserts 209. U.S. Pat. No. 6,369,344 and U.K. Patent No. GB2374824A disclose such an arrangement, the contents of which disclosures are hereby incorporated by reference.

After the inserts 209 are temporarily attached to substrate 201 they are permanently attached using a second braze material that is applied in a second brazing step. The second braze material is preferably applied by a flame-spraying process, which causes melted second braze material to coat the entire surface of the inserts. Capillary action causes the second braze material to enter all of the gaps between adjacent inserts and the gaps between the inserts and the substrate. Pips 206 preferably cause a gap between substrate 201 and insert 209 that is sized to allow molten braze material to be drawn into the gap by capillary action.

The second braze material preferably has a melting temperature less than the first braze material, and the flame spraying is controlled so that the temperature of the substrate and inserts does not rise above the melting temperature of the first braze material. This ensures that there is no possibility of compromising the connection between the TSP and the tungsten carbide bodies, or of the flame spraying process damaging the TSP by heating it up excessively. The skilled person will understand that various choices of second braze material that have a lower melting temperature than the first braze material would be possible, for example copper or nickel based alloys.

However, even if the same braze material is employed, or the second has a higher melting point than the first, nevertheless, this is unlikely to damage the connection between the TSP and the tungsten carbide. This is because inserts 209 are closely packed, and the outermost surface is covered by cap 205, so that TSP bodies 202 are protected from direct washing by the flame employed during second brazing step by the caps 205. This prevents damage to the brazed connection between the TSP bodies and the caps 205, and also to the TSP bodies themselves.

Once attached to tool surface 201 the exposed surface of inserts 209 is ground so that the hard-faced tool has a desired overall size in a finishing step. Preferably, the finishing step removes sufficient braze material to expose caps 205, which caps may be clearly visible by virtue of rounded corners (not shown in FIG. 7, but 211 in FIGS. 8 and 9), which cause gaps between adjacent inserts that are filled by the second braze material. The contrast between the caps 205 and the solidified braze material renders the caps clearly visible, so that a user can immediately see that the surface has been hard-faced. However, the finishing step preferably does not expose TSP bodies 202, as such bodies are extremely hard and difficult to grind and it is desirable to retain the full thickness of the TSP bodies so that the hard-faced tool retains maximum wear resistance and service lifetime. The thickness of caps 205 may be sufficient to accommodate the tolerances of both the tool and the TSP bodies, so that even for tools and TSP bodies at the extremes of the possible range of sizes, the finishing step exposes, but does not completely remove, the caps 205.

Figure 8A:
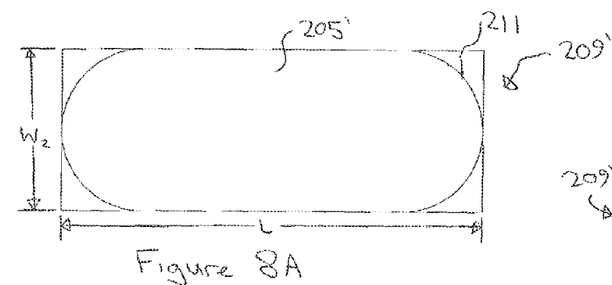
FIGS. 8A, B and C are plan, side and perspective views, respectively, of a suitable form of insert used in the arrangement of FIG. 7.
Figure 8B:
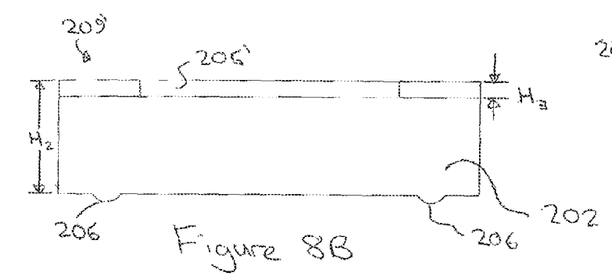
Figure 8C:
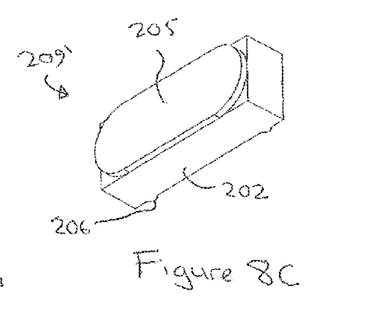

FIGS. 8A-8C show inserts for hard facing a substrate in an embodiment of the present invention. Insert 209' comprises a TSP body with a coating (not shown) comprising tungsten, preferably tungsten alloyed with 0.001-0.12 wt % fluorine. The first coating is preferably between 0.5 and 25 microns thick and renders the TSP body wettable with braze material. The tungsten in the coating may react with carbon from the TSP body to form a tungsten carbide interface layer between the coating and the TSP body. This significantly increases the strength of the attachment between the TSP body and the coating, as the interface layer provides a strong chemical bond.

The inserts 209' further comprise tungsten carbide caps 205', which caps are brazed to the upper surface of TSP bodies 202 using a copper based braze material as described in relation to the embodiment shown in FIG. 7. In the embodiment shown in FIGS. 8A-8C both tungsten carbide caps 205' and TSP bodies 202 have a generally rectangular plan section, the length L and width $W_2$ of the TSP bodies and the tungsten carbide caps being substantially the same. However, tungsten carbide caps 205' are provided with rounded corners 211 at all four corners. The radius of the rounded corners is approximately equal to half of the overall width $W_2$ of the TSP bodies 202 and the caps 205'. If inserts 209' are brazed to a substrate, for example a surface of a downhole tool such as a stabiliser, in a closely packed arrangement, rounded corners 211 advantageously provide a gap between the caps of adjacent inserts. This gap is filled with braze material, so that the surface to which the inserts are brazed may be subsequently ground to render the caps clearly visible by virtue of the contrast between the caps and the braze material, which will show a clear pattern between the inserts and the braze material. This pattern may indicate to a user that the tool has been successfully hard-faced. The small areas between adjacent corners which expose the corners of the TSP bodies 202 are not large enough to present a danger of compromising the TSP during the flame brazing step of fixing of the inserts 209' on the substrate.

Inserts 209' include pips 206 on the bottom surface of inserts 209', which pips locally increase the current density when inserts 209' are tack-welded to a substrate. Pips 206 comprise a part-cylindrical protrusion extending along the entire width of TSP bodies 202. However, the skilled person will understand that alternative arrangements, for example pips similar to the part-spherical protrusions 30' shown in FIGS. 5 and 6, are also possible.

Figure 9A:
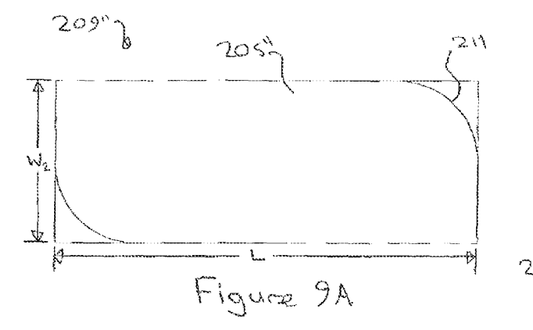
FIGS. 9A, B and C are plan, side and perspective views, respectively, of an alternative form of insert used in the arrangement of FIG. 7.
Figure 9B:
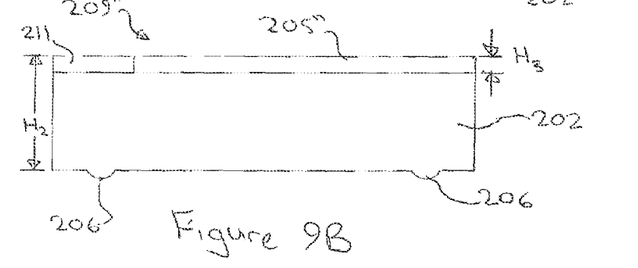
Figure 9C:
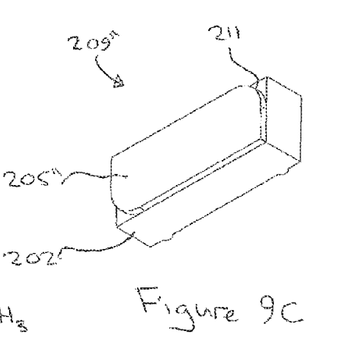

FIGS. 9A-9C show inserts 209" in a further embodiment of the present invention. Inserts 209" are similar to the inserts 209' shown in FIGS. 8A-8C, but only two of the corners of the plan section of caps 205" are rounded corners 211, the remaining corners forming a sharp point. Of course, the skilled person will understand that there are various possible arrangements of caps 205, 205', 205" that leave visible gaps between adjacent caps when inserts are brazed to a substrate in a closely packed arrangement, and those shown in FIGS. 8A-9C are provided by way of example only. Inserts 209' and 209" both have length L, which is preferably between 10 and 20 mm, width $W_2$, which is preferably between 3 and 10 mm and height $H_2$, which is preferably between 2 and 6 mm. Height $H_2$ is the sum of the height of the TSP bodies 202 and the height $H_3$ of the cap 205', 205". The height $H_3$ of caps 205', 205" is preferably between 0.2 and 1 mm. The size of the inserts may be adjusted based on the substrate that they are to be attached to. In particular, the length $L_2$ and width $W_2$ of the inserts must be significantly less than the radius of curvature of the substrate, so that the curvature of the substrate along the length of a particular insert is not significant.

As used herein the terms "top", "bottom", "upper", "lower" and variations thereof are used in relation to the orientation of inserts when they are attached to a horizontal substrate. That is, the face of an insert that is attached to the substrate (or the face that is adapted to be attached to a substrate in the case of an insert that is not yet attached to a substrate) is the lower, or bottom, face, and the face that is opposite the lower face is the top, or upper, face. The bottom face may also be referred to as the contact face.

Tungsten coating 203 is provided to increase the wettability of TSP body 202 with metal such as braze material. Preferably, tungsten coating 203 is applied in a way that allows the tungsten to react with the carbon in the TSP to form a tungsten carbide interface between the TSP and the tungsten, so that a strong chemical bond exists between the TSP body and the coating. As mentioned above, a suitable coating can be achieved using the coating process described in GB patent application number 1305637.9 of Hardide plc.

Once coating 203 is applied, cap 205, which preferably comprises tungsten carbide, is brazed to the coated TSP body, using a first braze material. The braze material coats TSP body 202 and cap 205. The first braze material also fills the small gaps between TSP body 202 and cap 205, thus firmly attaching cap 205 to TSP body 202. Brazing of cap 205 to TSP body 202 is preferably performed in a furnace, where the temperature and atmosphere can be tightly controlled. It is especially important to control the temperature during the brazing process, because TSP may be damaged by high temperatures. Cap 205 may be temporarily attached to TSP body 202 before brazing takes place. However, this is not essential as, provided the cap is held in contact with the TSP body during the brazing process, the cap will be firmly attached to the TSP body.

Once attached to tool surface 201 the exposed surface of inserts 209 is ground to a desired thickness in a finishing step. The present embodiment of the invention enables the entire surface of the substrate to be covered with TSP, rather than the patchwork effect of the embodiments described with reference to FIGS. 1 to 4. This is because there are no intervening walls 28 separating adjacent TSP bodies. Also, by virtue of the rectangular plan section of the TSP bodies and tungsten carbide caps 205, there are no significant gaps through which the flame of the flame spray used to braze the inserts 209 to substrate can penetrate to adversely affect the TSP.

Figures 10A, 10B:
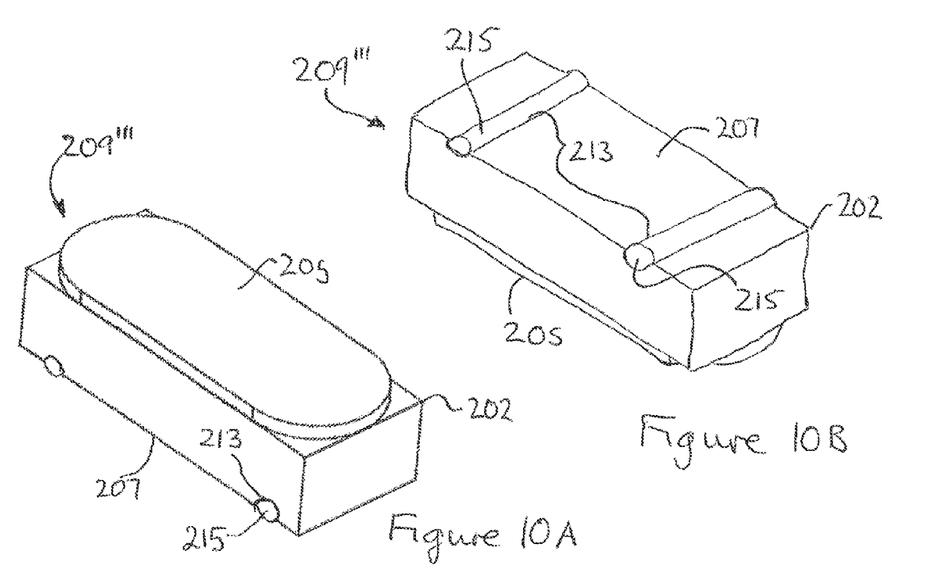

In FIGS. 10A and B, an insert 209''' is shown which differs from the insert 209' of FIGS. 8A to C only in that, instead of a pip or ridge 206 being formed on the contact side 207 of the TSP block 202, a groove 213 is formed. A rod 215 of tungsten carbide is brazed into the grove at the same time as the cap 205 is brazed on the top of the TSP block.

The advantage of this arrangement is that the current flowing over the surface of the block 202, through the coatings 203,208, during the tack-welding step, is concentrated at the pip/ridge 206, which is of course required to ensure sufficient heat is generated to melt the coating (and the substrate 201 in contact with the pip/ridge 206) and effect a weld connection with the substrate. However, there may be insufficient material in the coating at the pip/ridge to effect a reliable weld. With the arrangement shown in FIG. 10A,B, the rod 215 (which may be any electrically conductive metallic material element that can be brazed to the coated block 202) is securely fixed to the block and will provide good weld adhesion to the substrate 201.

Indeed, it is to be noted that the cap 205 is contacted by the welding rod in the tack-welding pre-attachment step of fixing the inserts to the substrate. The cap is an excellent conductor of electricity and evenly distributes the current from the welding rod (when energised) into the coating of the insert. The coating subsequently conducts the current to the pips 206 or rods 215, as the case may be.

Throughout the description and claims of this specification, the words "comprise" and "contain" and variations of the words, for example "comprising" and "comprises", means "including but not limited to", and is not intended to (and does not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

APPENDIX

Hardide Plc UK patent application No 1305637.9

Superabrasive Material With Protective Adhesive Coating and Method for Producing Said Coating The Patent application discloses a coating on mono- or poly-crystalline diamond or diamond-containing material. The coating comprises a first adhesive layer formed directly on the diamond or diamond-containing material, the first layer comprising tungsten and tungsten carbide alloyed with fluorine in an amount of 0.001 to 0.12 wt % calculated on the total weight of the first layer. The coating further comprises a second protective layer formed on the first layer, the second layer comprising at least tungsten alloyed with fluorine in an amount of 0.001 to 0.12 wt % calculated on the total weight of the second layer. The adhesive layer provides excellent bond strength to diamond, while the protective layer provides good protection against oxidation and molten metals used for attaching the coated diamonds to tools. The coating layers can be chemically deposited using several suitable methods, in some embodiments using Chemical Vapour Deposition, with the overall coating thickness between 0.6 and 500 µm, preferably between 3 and 50 µm.

Viewed from a first aspect, there is provided a coating on mono- or poly-crystalline diamond or diamond-containing material, the coating comprising a first adhesive layer formed directly on the diamond or diamond-containing material, the first layer comprising a mixture of tungsten and tungsten carbide alloyed with fluorine in an amount of 0.001 to 0.12 wt % calculated on the total weight of the first layer; and a second protective layer formed on the first layer, the second layer comprising at least tungsten alloyed with fluorine in an amount of 0.001 to 0.12 wt % calculated on the total weight of the second layer.

The second layer may comprise tungsten and tungsten carbide alloyed with fluorine in an amount of 0.001 to 0.12 wt % calculated on the total weight of the second layer.

Coatings according to U.S. Pat. No. 7,022,403 are alloyed with fluorine in an amount from 0.0004 wt % to 0.3 wt %. By way of extensive experimentation, the present applicant has surprisingly found that the adhesive, mechanical and protective properties of the coating are improved when the fluorine content is in a narrower range from 0.001 wt % to 0.12 wt %. A fluorine content below 0.001 wt % was found to be insufficient to achieve the effect of enhancing tungsten reactivity and strengthening the mechanical and protective properties of the coating. A fluorine content above 0.12 wt % was found to raise a risk of excess fluorine causing degradation of the adhesion and cohesion of the coating, especially if the coated diamonds are used at elevated temperatures and in the presence of water or oxygen.

The first layer typically has a finer crystalline structure than the second layer, which may help to provide improved protection for the underlying diamond.

Carbon in the tungsten carbide of the first layer will generally be derived from the diamond or diamond-containing material on which the first layer is formed, which helps to promote strong adhesion of the first layer to the diamond substrate.

The first and/or the second layers are preferably chemically-deposited layers as opposed to physically-deposited layers.

The first layer may include at least one of tungsten monocarbide (WC) and tungsten semicarbide ($W_2C$).

The first layer may have a thickness of 0.1 to 4 µm.

The first layer may consist essentially of metal tungsten (W), tungsten monocarbide (WC) and tungsten semicarbide ($W_2C$), mixed in a composite layer, all alloyed with fluorine in an amount of 0.001 to 0.12 wt %. In some embodiments, the first layer has a molar ratio of WC:$W_2C$:W in a range (1-100):(5-20):(1-100)

The second layer may include at least one of tungsten monocarbide (WC) and tungsten semicarbide ($W_2C$).

Preferred embodiments are characterised by an absence of brittle tungsten subcarbides such as $W_3C$ and/or $W_{12}C$.

The second layer may include tungsten carbide nanoparticles dispersed in a matrix of metal tungsten, alloyed with fluorine in an amount of 0.001 to 0.12 wt %.

The second layer may itself be formed as a plurality of alternating sublayers of tungsten carbide alloyed with fluorine and tungsten alloyed with fluorine. The sublayers of tungsten carbide alloyed with fluorine may each be less than 4 µm in thickness. Alternatively, the second layer may itself be formed as a plurality of alternating sublayers of tungsten alloyed with fluorine, and tungsten carbide nanoparticles dispersed in a matrix of metal tungsten, alloyed with fluorine. The sublayers of tungsten carbide nanoparticles dispersed in a matrix of metal tungsten may each be less than 4µm in thickness. The sublayers may have a respective thickness ratio from 10:1 to 1:10.

The second layer may have a thickness of 0.5 to 500 µm, preferably of 3 to 50 µm.

The coating may be formed on diamond or diamond-containing material comprising diamond, mono-crystalline diamond, poly-crystalline diamond, diamond-silicon carbide composites or other diamond-containing materials substantially free from metal catalysts and is thermally stable at temperatures up to at least 800° C.

The diamond or diamond-containing material may be substantially completely coated. Alternatively, it may be substantially completely coated except for portions where it has been held during coating, for example by way of tongs, clamps, forceps or the like.

The first and second layers are preferably substantially free from through porosity and/or through cracks.

The first and second layers may together consist of 93.88 to 99.95 wt % tungsten.

The first and second layers are preferably free from non-refractory binder materials.

The coating may have a hardness from 4.0 to 25 GPa, preferably from 6 to 18 GPa.

Viewed from a second aspect, there is provided a superabrasive element comprising mono- or poly-crystalline diamond or diamond-containing material coated with the coating of the first aspect.

Viewed from a third aspect, there is provided a cutting or drilling tool incorporating at least one superabrasive element of the second aspect.

Viewed from a fourth aspect, there is provided a method for producing a cutting or drilling tool of the third aspect, wherein the superabrasive element is attached to a tool substrate by wetting the second, protective layer of the coating with molten metal. The metal may be selected from the group comprising: cobalt, nickel, iron, copper, titanium, silver, gold, aluminium, indium and alloys containing at least two of these metals. The molten metal may be applied by way of infiltration, casting, brazing, spraying, welding, soldering, Hot Isostatic Pressing (HIP) or High Temperature High Pressure (HTHP) cycling.

Viewed from a fifth aspect, there is provided a method of applying a coating to a substrate comprising mono- or poly-crystalline diamond or diamond-containing material, wherein a first adhesive layer is formed directly on the substrate by a first stage chemical deposition process, the first layer comprising a mixture of tungsten and tungsten carbide alloyed with fluorine in an amount of 0.001 to 0.12 wt % calculated on the total weight of the first layer and wherein a second protective layer is formed on the first layer by a second stage chemical deposition process, the second layer comprising at least tungsten alloyed with fluorine in an amount of 0.001 to 0.12 wt % calculated on the total weight of the second layer.

The first stage chemical deposition process may comprise placing the substrate in a carbon-free solid powder medium comprising metallic tungsten powder and fluorides (the fluorides in an amount of 0.1 to 10 wt %), heating in a vacuum or an inert gas atmosphere, and holding at a temperature of 800 to 1050° C. for at least 10 minutes to form the first adhesive layer. Due to the extremely low vapour pressure of tungsten, it is not possible to apply this refractory metal coating by evaporation/condensation at temperatures that diamond can withstand without degradation. Instead, a tungsten fluoride diffusion process is used, and during this diffusion process treatment, tungsten fluorides are transferred through the vapour phase from the surfaces of tungsten particles to the surface of the diamond, where tungsten fluorides are reduced by carbon from the diamond surface, forming tungsten carbides as well as tungsten. This is a chemical process, involving formation and reduction of tungsten fluorides and tungsten carbides, where fluorine plays a key role as a transport agent. The composition and structure of the first coating layer are determined by the balance of the complex simultaneous and interconnected processes of tungsten transfer through the vapour phase, reduction of tungsten and formation of tungsten carbides. The optimal regimes for deposition of this first coating layer were developed via extensive experimentation, and included determining the process temperature, heating and cooling rates, pressure and composition of the solid powder medium best suited to achieve the target coating parameters.

Other chemical methods of producing the first coating layer can also be used, such as Chemical Vapour Deposition, electrolysis of molten salts of tungsten, and reaction of tungstic acid salts in the presence of fluorides.

In a CVD process, the first stage chemical deposition process may comprise placing the substrate in a gaseous medium comprising $WF_6$ and hydrogen at a volumetric ratio of tungsten hexafluoride to hydrogen from 0.6 to 0.1, at a temperature of 400 to 600° C. and a pressure of 0.5 to 20 kPa for at least 2 minutes to produce a layer of tungsten alloyed with fluorine in an amount from 0.001 to 0.12 wt %, with a thickness of at least 0.1 μm, followed by heat treatment at a temperature between 800° C. and 1000° C. for at least 10 minutes to form the first adhesive layer.

In an alternative CVD process, the first stage chemical deposition process may comprise placing the diamonds or diamond-containing substrate in a gaseous medium comprising $WF_6$ and hydrogen, at a temperature of 350 to 600° C. and a partial pressure of 0.1 to 20 kPa with a volumetric ratio between $WF_6$ and hydrogen ranging from 3:5 to 1:10 for at least 3 minutes to form the first coating layer. The resulting thin layer of tungsten alloyed with fluorine can then be heat treated at a temperature in excess of 800° C. to achieve inter-diffusion of the tungsten metal and carbon from the diamond surface, and also a reaction between tungsten and carbon producing tungsten carbides.

The layer of tungsten alloyed with fluorine may be applied to a thickness up to 50 μm.

Other chemical methods of producing the first coating layer have also been investigated, including electrolysis of molten salts of tungsten and the reaction of tungstic acid salts in the presence of fluorides. Electrolysis of triple fluoride eutectic LiF—NaF—KF was conducted in a rotating graphite crucible at a temperature of 760-780° C. and a current density of 500 A/m². Other salt melts can also be used, such as wolframic melt 79% NaCl+20% $Na_2WO_4$+1% $Na_2CO_3$. At 850° C. and a current density up to 6000 A/m2 a dense layer of Tungsten was produced with a thickness of 5-6 μm in a single electrolysis cycle.

Tungsten layer deposition by a reaction of tungstic acid salts in the presence of fluorides uses a mixture of the salts $KWO_4$ and KF, which is applied on the surface of diamonds, and then heated in an atmosphere of inert gas with hydrogen to 500-1200° C. As a result of the reactions, a layer of tungsten oxide alloyed with fluorine is produced on the diamond surface. This tungsten oxide is then reduced by hydrogen to metal tungsten alloyed with fluorine. Fluorine is the most electronegative element with an extremely high electron affinity. When fluorine is present as an alloying element in optimal amounts, it reduces the temperature of the reduction of tungsten oxides by hydrogen. At the same time, carbon diffusion into tungsten and chemical reactions between carbon and tungsten result in the formation of tungsten carbides on the boundary between the diamond surface and the tungsten layer.

The first coating layer can also be produced by other methods, such as Physical Vapour Deposition (PVD), electrochemical and electroless deposition of tungsten from solutions.

By way of extensive experimentation conducted by the present Applicant, it was surprisingly found that to achieve optimal mechanical and chemical properties, the coating on diamonds should contain fluorine in amounts ranging from 0.001 to 0.12 wt % calculated on the total weight of the first layer. In addition to acting as a tungsten transport agent, fluorine when present in optimal amounts enhances the reactivity of tungsten with carbon as well as the mechanical properties of tungsten. It is known that pure tungsten reacts with carbon (as graphite) to form tungsten carbides at temperatures above 1050° C. in a process called carburization [Tungsten Properties, Chemistry, Technology of the Element, Alloys and Chemical Compounds, Erik Lassner, Wolf-Dieter Schubert, Kluwer Academic, 1999]. Pure tungsten also reacts with carbon (as diamond) above 1000° C., but this high temperature can cause diamond degradation, especially of polycrystalline sintered diamonds and synthetic diamond grit with residual catalysing metals. Because fluorine is the most electronegative element with one of the highest electron affinity values (3.45 eV (340 kJ/mole)) among chemical elements, it is considered to be the most powerful oxidizing element. By attracting electrons from surrounding atoms, such as tungsten atoms, fluorine increases the reactivity of tungsten and thus reduces the temperature of its chemical reactions, at least when fluorine is present as an alloying element in tungsten in an optimal concentration. From experimentation, it was found that a fluorine concentration below 0.001 wt % is too low to have any significant effect on the reactivity of tungsten. Moreover, when fluorine is present in and amount more than 0.12 wt %, it can cause undesirable chemical transformations to the tungsten, especially at elevated temperatures and in the presence of water or oxygen. Both the diffusion process of forming the first coating layer described in this application and other methods such as CVD followed by heat treatment were developed to achieve this optimal alloying concentration of fluorine between 0.001 wt % and 0.12 wt %. This allows enhanced reactivity of alloyed tungsten with diamond carbon to be achieved, and the production of tungsten carbides at lower temperatures in the range of 800 to 970° C. This lower formation temperature of tungsten carbides does not damage many of the grades of the industrial diamonds, such as diamond grit and TSP polycrystalline diamonds. The formation of tungsten carbides is essential to form strong chemical bonds between the tungsten coating and the diamond surface.

The second stage chemical deposition process may comprise placing the substrate coated with the first adhesive layer in a gaseous medium comprising $WF_6$, hydrogen and optionally hydrocarbons, at a temperature of 350 to 600° C. and a partial pressure of 0.1 to 20 kPa for at least 10 minutes to form the second protective layer.

At least one of the coatings may be deposited by way of vapour phase deposition, the vapour being non-ionized and chemically active during the deposition process, with the substrate being moved during the deposition process so as to obtain complete coating over the entire substrate surface.

The substrate may comprise diamond or diamond-containing grit or elements.

In certain embodiments, diamond grains and polycrystalline diamond parts are coated with a thick (typically up to 100 μm) pore-free coating which contains both tungsten and tungsten carbides, applied by a chemical method such as Chemical Vapour Deposition (CVD) (in contrast to the physical deposition method of WO 2005/078041). Due to the crystallization of the coating from the gas phase, CVD methods allow uniform coating of complex shapes and porous surfaces, such as polycrystalline diamond parts, with the coating even penetrating inside the pores and sealing smaller pores. During the CVD coating crystallization of tungsten and tungsten carbide, tungsten atoms produced on the growing surface as a result of chemical reactions have high mobility, thus filling the low energy positions in the coating structure, producing a substantially pore-free layer. This coating has significantly better protective properties against molten metals and other aggressive media.

Unlike the coating of WO 2005/078041, the coating of embodiments of the present application always contains tungsten carbides, first of all as an innermost layer of the coating formed using carbon from the diamond surface and thus forming a strong chemical adhesion bond. Some coating variants may also include tungsten carbide dispersed in a metal tungsten matrix and layers of tungsten carbide disposed between layers of tungsten.

The present Applicant has undertaken extensive experimentation and testing, and has found that the optimal coating for diamonds should have sufficient thickness to protect the diamond against aggressive metals, be free from brittle tungsten subcarbide phases, and especially should avoid deposition of these phases as continuous layers prone to fracture failure. The internal layer of the optimal coating should have a composite structure rather than a layered structure. The composite structure preferably consists of a dispersed mixture of all three phases: tungsten monocarbide WC, tungsten semicarbide $W_2C$ and metal tungsten; this gives the coating the combination of enhanced toughness with high hardness. The external layer of an optimal coating must have sufficient hardness to resist abrasion/erosion. All these conclusions resulted in the development of the new protective adhesive coating disclosed in this application.

The coating of the present application has been developed to help protect the diamond from oxidation and also from attack by aggressive metal bonds, such as cobalt, nickel or iron, which have catalytic properties and can cause diamond conversion into soft graphite—an effect called "graphitization"—which is detrimental to the diamond wear resistance. The coating is intended to enhance diamond retention within tools, as the innermost layer of the coating has a strong chemical bond to the diamond, and its external layer has good wettability with molten metal bonds, brazing and casting alloys used in diamond tools.

Coatings of the present application can be used (without limitation) to protect monocrystalline diamonds, diamond grit, polycrystalline diamonds, Thermally Stable Products (TSP), diamond-silicon carbide composite elements, silicon cemented diamond and other diamond-containing materials, which thermally stable at a temperature of at least 800° C.

By way of extensive experimentation, it was surprisingly found that to provide optimal protection for diamonds and diamond-containing materials, the coating ideally required a combination of properties and characteristics, including the following:

1. Strong adhesion bond of the coating to diamond.
2. The coating method should achieve continuous coating of the majority of the grain surface of the diamond grit or the whole surface of polycrystalline diamond parts.
3. Sufficient thickness and suitable structure to prevent diffusion of molten metals to the diamond.
4. The coating should be substantially free from porosity and micro-cracks, which can let oxygen or molten metals attack the diamond.
5. The coating should have a coefficient of thermal expansion (CTE) close to the CTE of diamond or the diamond-containing material to reduce stresses.
6. Sufficient hardness to resist mechanical abrasion, but also enhanced toughness and ductility to prevent brittle failure and micro-cracking of the coating during mechanical or thermal shocks.
7. The external surface of the coating should have good wettability by molten metal binders, brazing and casting alloys.

None of the prior art coatings meets all the above listed requirements.

The coating of embodiments of the present application, which was developed after extensive experimentation, consists of partially-carbided tungsten, alloyed with fluorine. Methods of producing this coating achieve a strong chemical bond of the coating to the coated diamonds, by forming a layer of tungsten carbide formed by the chemical reaction of tungsten with carbon from the diamond surface.

The methods enable the production of thick coatings with thicknesses up to 150 μm, in some cases up to 500 μm, substantially free from porosity and micro-cracks. These thick and pore-free coatings form a strong barrier against diamond oxidation or diffusion of molten metals which can cause diamond graphitization.

Some prior art methods of coating diamonds (e.g. WO 2005/078041) use physical vapour deposition (PVD) techniques which can coat only line-of-sight areas and are not able to coat inside pores with a high aspect ratio of pore depth to diameter. Some polycrystalline diamond materials, such as TSP diamonds or fully-leached polycrystalline diamond disks, can have very deep pores with intricate shapes when the catalysing metal binder used to produce these polycrystalline parts is leached off. Other prior art methods for coating diamonds (e.g. U.S. Pat. No. 7,022,403) or metal parts (e.g. U.S. Pat. No. 6,800,383 and US2009/0117372) allow the coating of stationary parts, with some areas used to support these parts during coating deposition remaining uncoated. The resulting porosity in the coating or the uncoated areas do not provide the necessary degree of protection against oxidation and molten metals, which can penetrate through the coating porosity and cause diamond graphitization.

To resolve this problem, the method of chemical deposition or CVD was found most suitable to produce the required thick, pore-free coating. Chemical deposition allows conformal coating of non-line-of-sight areas, including deep intricate pores. In one embodiment, the superabrasive elements are moved at certain stages of the coating deposition, thus enabling these elements to be coated over all or most of their surface, for example with at least 90% of the total surface area being coated.

Some embodiments of the coatings of the present application combine enhanced hardness with toughness. This is necessary to protect diamond elements from erosion during the metal-spraying processes often used during hard-facing, and also from abrasion and erosion of the diamond-containing hard facing during its operation, for example on an oil drilling tool.

U.S. Pat. No. 7,022,403 discloses a single-stage coating deposition process, using either a diffusion method or a CVD coating deposition with subsequent annealing. Single-stage coating depositions can usually only produce thin coatings (typically a few micrometres, maximum 10 μm) which may not give sufficient protection for the diamond. Such coatings may also have non-optimal composition and structure, since the single-stage coating deposition does not provide full flexibility in controlling or modifying the coating characteristics.

The coating of embodiments of the present application has two layers: an inner adhesive layer with a strong chemical adhesion bond to diamond, and an outer protective layer. These layers may be produced in two separate processes: the inner adhesive layer can be produced by a diffusion method or by a CVD process followed by heat treatment, and the outer protective layer can be produced by a chemical method, such as Chemical Vapour Deposition (CVD). This allows the building of much thicker coatings with significantly lower internal stresses due to thermal expansion mismatch. Using two separate coating deposition processes also provides much better control over the phase composition and structure of each of the two layers, which can be optimised independently from each other as detailed below.

The inner adhesive layer, which is applied directly on the diamond or diamond-containing material, may consist essentially of tungsten monocarbide (WC), tungsten semicarbide ($W_2C$) and metal tungsten, mixed in a composite layer, all alloyed with fluorine present in an amount of 0.001 to 0.12 wt %. Extensive experimentation determined that the adhesive layer was advantageously free from tungsten subcarbide phases $W_3C$ and $W_{12}C$, which have poor mechanical properties, are brittle and have high residual stresses. The inner adhesive layer may be produced by a diffusion method, which may be optimised to achieve a target layer composition and structure. In particular, in order to prevent or at least suppress the formation of brittle subcarbide phases $W_3C$ and $W_{12}C$, the diffusion process temperature should be at least 800° C.

A solid powder medium charge may be used to produce the inner adhesive layer, the charge containing metal tungsten powder and fluorides in an amount from 1 to 10% wt. This not only enables the formation of the inner adhesive layer in a composition free from brittle tungsten subcarbide phases, but also enables an improved structure for the inner layer to be realised. The coating for diamonds disclosed in U.S. Pat. No. 7,022,403 provides an inner adhesive layer with a layered phase structure, including a first innermost layer of tungsten monocarbide WC, a second layer of tungsten semicarbide $W_2C$ deposited over the first layer, further layers of tungsten subcarbides $W_3C$ and $W_{12}C$ over the previous layers, and finally a layer of metal tungsten. It has been found that this layered structure may not always have ideal mechanical properties, and in some implementations can be brittle and have high mechanical stresses. The present coating, in contrast, has a composite structure where different phases (including WC, $W_2C$ and metal tungsten) are mixed together rather than layered on top of each other. This mixed composite structure allows coating hardness and mechanical strength to be combined with enhanced toughness and ductility. In addition, there is a reduction in mechanical and thermal expansion mismatch stresses during deposition of the coating and the use of diamonds coated with the coating. After extensive experimentation, appropriate regimes of producing the inner adhesive layer were developed, result in a coarser morphology of the newly-developed inner adhesive layer. Unlike the smooth morphology of the previously patented layered coating (U.S. Pat. No. 7,022,403), this coarser morphology provides a stronger adhesion bond to diamonds and diamond-containing materials and also provides a keying surface for a stronger adhesion bond of the external protective layer to the inner layer. The inner adhesion layer is still finer than the external protective layer, but coarser than the layer of U.S. Pat. No. 7,022,403.

The outer, protective layer of the present coating is produced mainly or substantially by way of chemical deposition, which in contrast to physical deposition methods allows a continuous and uniform coating of the majority of the superabrasive element surface to take place, including coating inside open pores. Polycrystalline diamonds, such as Thermally Stable Product (TSP), can be sintered from diamond grit using catalysing metals usually from the iron group, such as nickel, cobalt or iron, which act as a solvent during sintering to fuse individual diamond grains together. Catalysing metal that may remain in the interstitial pores between the sintered diamond grains can then be leached away to improve the thermal stability of the TSP. Catalyst-free TSP diamonds can withstand temperatures in excess of 1000° C., which would cause diamond graphitization if the metal catalyst remained in contact with diamond. TSP diamonds are sometimes infiltrated with a non-catalysing filler, such as silicon, but their surfaces tend to remain uneven and porous, and difficult to attach to a metal tool body. Preferred embodiments of the present coating are substantially pore-free and crack-free, and have sufficient thickness to seal the interstitial porosity in the polycrystalline diamonds and diamond-containing materials. This prevents infiltration of the molten metal binder (such as brazing alloy, cobalt binder, metal infiltrant alloys) into the interstitial pores. Consequently, this can enhance the thermal stability of polycrystalline diamond tools, as most of these metal binders have thermal expansion coefficients (TECs) substantially higher than the TEC of diamond, and can mechanically rupture the polycrystalline diamond at elevated temperatures.

Thermal metal spraying is often used as part of the process for attaching diamonds as hard-facing on the surface of oil drilling string stabilizers. To protect diamonds from oxidation and also from mechanical erosion by the sprayed molten metal, the coating should have sufficient erosion resistance. Coated polycrystalline superabrasives on the wear surfaces of oil drilling tools and in other applications are exposed to highly abrasive and erosive conditions, for example being abraded against rock formations and being exposed to high velocity flows of drilling mud carrying sand and stone chippings. The coated polycrystalline superabrasives are also exposed to impact and shock loads. If the coating is not able to resist these abrasive and erosive conditions, or is too brittle and fractures under shock load, then the coated superabrasive element can be lost. Erosion and abrasion resistance of the coating are important when diamonds with thick protective coatings are used in diamond tools, since selective erosion or abrasion of the coating layer can gradually form a gap between the diamond and the tool matrix, and this gap can weaken retention of the diamond and can lead to loss of the diamond. In order better to resist erosion and abrasion, the coating should combine enhanced hardness with toughness and ductility. This combination of hardness with toughness has been found by the present Applicant to give the best overall protection resisting various mechanisms of wear and erosion: the enhanced hardness inhibits micro-cutting mechanisms of wear and erosion, while the coating toughness and ductility prevent fatigue micro-cracking/chipping and platelet mechanisms of erosion. Extremely hard but brittle materials such as binder-free tungsten carbide are likely to fail due to brittle fracture, and are known to fail in erosive conditions under high angles of attack due to micro-cracking. Tough and ductile materials with low hardness are known to fail under low angle erosion due to micro-cutting actions, and are expected to wear in abrasive environments. Thermo-mechanical stresses due to thermal expansion/contraction mismatch between the coating and the substrate, as well as thermal shock combined with mechanical impact during metal spraying, also require sufficient ductility and toughness of the coating, as brittle coatings are likely to fracture.

Toughness and ductility of the coating are also essential for applications where diamond tools can suffer from shock loads and impact, such as oil drilling tools. Brittle coatings such as pure tungsten carbide can fracture after impact. Even a micro-crack can become a stress concentrator when the tool is used with high shear loads applied to diamonds, and can quickly develop through the brittle coating material, resulting in separation of the diamond from the tool. Loss of one such superabrasive element can increase the mechanical shear load on the neighbouring elements. Such loss can also interrupt the cutting action and increasing shock loads on the next most exposed superabrasive element, which then becomes more likely to fail, leading to a "domino" effect and premature failure of the whole hard-facing area.

To resist these conditions, an optimal coating should combine sufficient hardness to resist abrasive wear with enhanced toughness and ductility to resist impact. By way of extensive experimentation and testing, it was found that coatings including both tungsten carbide and metal tungsten in predetermined proportions and also with certain material structures, may demonstrate such a combination of properties. Tungsten carbide provides enhanced hardness and metal tungsten provides toughness and ductility. To achieve improved performance, these composite protective coatings of embodiments of the present application can have one of two specific structures.

In one embodiment the coating has a layered structure with alternating thin layers consisting predominantly of metal tungsten and of tungsten carbide or a mixture of tungsten with tungsten carbides. The overall hardness and toughness of the layered coating can be controlled by adjusting the thicknesses of the individual layers, their ratios and the phase composition of individual layers. In preferred embodiments, excellent protective properties can be achieved with a ratio of the thicknesses of individual tungsten and tungsten carbide-containing layers ranging from 1:10 to 10:1. The total thickness of these coatings can be up to 50 μm, in some cases up to 100 μm, and in some cases where extremely thick coatings are required up to 500 μm, and the overall hardness of this type of multi-layer coating can be in the range from 4 to 25 GPa, preferably 6 to 18 GPa.

In another embodiment, the coating comprises tungsten carbide nano-particles dispersed in a metal tungsten matrix. In this embodiment, the overall hardness and toughness of the composite coating can be controlled by varying the amount of tungsten carbide nano-particles, along with their size and phase composition. Preferred embodiments have excellent protective properties when the hardness is in the range of 6 and 18 GPa, and the coating thickness up to 100 μm, in some cases where extremely thick coating is required up to 500 μm.

I claim:

1. A hard faced surface comprising:
   a) a metal substrate,
   b) inserts comprising:
      i) an ultra-hard body in a geometric shape having a plan section enabling a plurality of the bodies to be tiled over a surface without substantial gaps between them, a contact surface and a flat top surface;
      ii) a boundary coating of tungsten on the ultra-hard body to render the body wettable by braze material, wherein the tungsten reacts with carbon or nitrogen across the surface boundary of the body to form a tungsten carbide or tungsten nitride interface between the boundary coating and the body; and
      iii) a tungsten carbide cap brazed to at least the top surface of the ultra-hard body with a first braze material;
   c) the inserts are attached at the contact surface to the substrate as a covering layer on the substrate, wherein
   d) the inserts are brazed to the substrate in a side by side formation with a second braze material that penetrates the gaps between the inserts and between the contact surface of the bodies and the metal substrate, the tungsten carbide caps of the inserts providing a gauge for the hard faced surface that is ground in a finishing step, which finishing step serving to expose the caps and to remove at least a portion of the depth of the caps.

2. The hard faced surface of claim 1, in which pips are disposed on the contact surface of the bodies to facilitate tack-welding of the inserts to the substrate.

3. The hard faced surface of claim 1, in which said plan section is rectangular and said side by side formation is a closely packed tile formation, whereby the ultra-hard body is shielded from direct washing with flame in a flame-spray brazing step employed to braze the inserts to the substrate.

4. The hard faced surface of claim 3, in which side walls of the ultra-hard bodies are separated from each other in said formation only by said second braze material.

5. The hard faced surface of claim 3, wherein the inserts are arranged in a plurality of rows, each row comprising a plurality of inserts disposed in an end-to-end arrangement.

6. The hard faced surface of claim 5, wherein the inserts in adjacent rows are offset by a distance approximately equal to half the length of the inserts.

7. The hard faced surface of claim 3, wherein the inserts are tiled on the substrate in a chevron or herring-bone pattern of overlapping inserts.

8. The hard-faced surface of claim 3, wherein at least 50% of the surface area of said metal substrate is covered by said inserts, the remaining area comprising space between the inserts filled with the second braze.

9. The hard-faced surface of claim 3, wherein at least 60% of the surface area of said metal substrate is covered by said inserts, the remaining area comprising space between the inserts filled with the second braze.

10. The hard-faced surface of claim 1, wherein the second braze material is different from the first braze material.

11. The hard-faced surface of claim 1, wherein the metal substrate is the outer surface of a drill string stabiliser.

12. The hard faced surface of claim 1, wherein said ultra-hard body is thermally stable polycrystalline diamond.

13. The hard faced surface of claim 1, wherein the boundary coating comprises tungsten alloyed with fluorine.

14. The hard faced surface of claim 1, wherein the boundary coating comprises a first coating that is between 0.1 and 25 microns thick.

15. The hard faced surface of claim 14, wherein the boundary coating further comprising a second coating applied to the ultra-hard body, wherein the second coating comprise tungsten between 5 and 30 microns thick, and wherein the first coating is less than 5 microns thick.

16. The hard faced surface of claim 1, wherein the tungsten carbide cap is between 0.2 and 1 mm thick.

17. The hard faced surface of claim 1, wherein said first braze material is a copper-based braze material.

18. The hard faced surface of claim 1, wherein the ultra-hard body is substantially cuboidal in shape, whereby the plan section of ultra-hard body is substantially rectangular.

19. The hard faced surface of claim 18, wherein the plan section of the tungsten carbide cap is substantially the same as the plan section of the ultra-hard body.

20. The hard faced surface of claim 19, wherein the plan section of the tungsten carbide cap has at least one rounded corner.

21. The hard faced surface of claim 1, further comprising at least one pip on a bottom surface of the ultra-hard body, which pip facilitates tack-welding of the insert onto the substrate.

22. The hard faced surface of claim 21, wherein the pip comprises a separate element brazed onto the contact surface.

23. The hard faced surface of claim 22, wherein the ultra-hard body is formed with a groove in which to receive said element.

* * * * *